(12) United States Patent
Mimura

(10) Patent No.: US 6,295,451 B1
(45) Date of Patent: Sep. 25, 2001

(54) MOBILE COMMUNICATION SYSTEM, BASE STATION, AND BASE STATION CONTROLLER

(75) Inventor: Masahiko Mimura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/195,613

(22) Filed: Nov. 19, 1998

(30) Foreign Application Priority Data

Nov. 21, 1997 (JP) .................................................... 9-321195

(51) Int. Cl.$^7$ ...................................................... H04Q 7/20
(52) U.S. Cl. .......................... 455/436; 455/525; 455/439; 455/453
(58) Field of Search ..................................... 455/436, 439, 455/438, 443, 453, 525, 33.1, 33.2, 56.1, 442, 437; 370/331, 345; 379/59

(56) References Cited

U.S. PATENT DOCUMENTS

| | | | |
|---|---|---|---|
| 4,881,271 | * 11/1989 | Yamauchi | 455/56 |
| 5,212,806 | * 5/1993 | Natarajan | 455/33.2 |
| 5,241,685 | * 8/1993 | Bodin | 566/56.1 |
| 5,404,576 | * 4/1995 | Yahagi | 455/56.1 |
| 5,408,514 | * 4/1995 | Sakamoto | 379/59 |
| 5,499,395 | * 3/1996 | Doi | 455/33.1 |
| 5,594,943 | * 1/1997 | Balachandran | 455/33.2 |
| 5,828,661 | * 10/1998 | Weaver, Jr. | 370/331 |
| 5,907,807 | * 5/1999 | Chavez, Jr. | 455/436 |
| 5,912,884 | * 6/1999 | Park | 370/331 |
| 5,982,758 | * 11/1999 | Hamdy | 370/331 |
| 6,128,493 | * 10/2000 | Song | 455/436 |

* cited by examiner

Primary Examiner—Nguyen T. Vo
Assistant Examiner—John J. Lee
(74) Attorney, Agent, or Firm—Banner & Witcoff, Ltd.

(57) ABSTRACT

A control station manages available channel counts in base stations, and notifies each base station of the available channel counts. Each base station compares the priority values of the respective base stations which are obtained by adding the available channel counts notified from the control station to the pilot reception power values, in a mobile station communicating through a radio path connected to the self-station, which are related to the respective base stations. The base station then performs handoff processing to switch the radio path connected to the mobile station to the base station with the maximum priority value. With this operation, the traffic can be distributed without increasing the base station facilities and requiring complicated and cumbersome control, thereby providing stable communication services.

22 Claims, 12 Drawing Sheets

| ELAPSED TIME (sec) | 5 | 10 | 15 | 20 | --- | 120 | 125 |
|---|---|---|---|---|---|---|---|
| CORRECTION VALUE FOR BASE STATION B | +29 | +28 | +27 | +26 | --- | +6 | +5 |

| AVAILABLE CHANNEL COUNT | CORRECTION VALUE |
|---|---|
| ⋮ | ⋮ |
| 30 | $\frac{X}{2}$ |
| ⋮ | ⋮ |
| 60 | X |
| ⋮ | ⋮ |

| AVAILABLE CHANNEL COUNT | CORRECTION VALUE |
|---|---|
| ⋮ | ⋮ |
| 30 | $\frac{X}{3}$ |
| ⋮ | ⋮ |
| 60 | X |
| ⋮ | ⋮ |

MOBILE COMMUNICATION SYSTEM, BASE STATION, AND BASE STATION CONTROLLER

BACKGROUND OF THE INVENTION

The present invention relates to a mobile communication system of a cellular scheme such as a automobile telephone system or a portable telephone system, and a base station (BS) and base station controller (BSC) which are used for the mobile communication system.

It is generally known that a radio wave emitted from a given radio station is attenuated in proportion to the power of the distance from the radio station. For this reason, according to the cellular scheme, many base stations are distributed to form cover areas called cells, and each base station takes charge of the mobile stations in each cover area.

In such a cellular scheme, when a mobile station moves between cells during communication, the base station taking charge of the mobile station changes. In this mobile communication system, handoff processing is performed to change the base station that connects the radio path to the mobile station.

In general, handoff processing is performed to connect a radio path between the mobile station and a base station with a higher reception power on the basis of the reception power of a transmission signal received by the mobile station from each base station. More specifically, in a mobile communication system using a CDMA (Code Division Multiple Access) scheme, each base station transmits a pilot channel. Each mobile station measures the reception electric field strength of each pilot channel that can be received, and notifies the base station that connects the radio path to the mobile station of the measurement results. The base station compares the respective pilot reception powers (the reception electric field strengths of the respective pilot signals) received from the mobile station of which the base station is taking charge. If there is another base station that has a pilot reception power higher than the reception electric field strength of the pilot channel transmitted by the above base station, handoff processing is executed to shift the charge of the mobile station to this other base station.

FIG. 1 shows the distribution of pilot reception power associated with adjacent base stations A and B which transmit pilot channels with the same transmission power.

As is obvious from this graph, the pilot reception power of the base station A becomes equal to that of the base station B at a point C as a middle point between the base stations A and B. The pilot reception power of the base station A becomes larger than that of the base station B at any point closer to the base station A than the point C. The pilot reception power of the base station B become larger than that of the base station A at any point closer to the base station B than the point C. Consequently, the handoff execution boundary between the base stations A and B is the point C, i.e., the middle point between the base stations A and B.

When, therefore, base stations are arranged as in FIG. 2, if each base station has its communicative area within the circle indicated by the dashed line in FIG. 2, the cell formed by each base station falls within the hexagonal range indicated by the solid line in FIG. 2.

Since the transmission power of each base station is almost fixed, each cell is fixed to the state shown in FIG. 2. For this reason, even if the traffic in a specific cell is larger than that in an adjacent cell, when a mobile station that has been located in the adjacent cell moves closer to the base station that manages the specific cell, handoff to the base station in the specific cell must be performed. As a result, traffic may concentrate on the specific cell.

For example, a method of locally forming a small cell (micro-cell) at a portion, in a cell, in which the traffic is heavy may be used as a method of preventing traffic concentration. In this case, however, many facilities must be added to the base station, and the coexistence of cells (macro-cells) and micro-cells results in complex, cumbersome control.

As described above, according to the prior art, since the size of each cell is fixed, traffic concentration on a specific cell cannot be avoided.

If micro-cells are formed to prevent such traffic concentration, the base station facilities must be increased, and complex, cumbersome control is required.

BRIEF SUMMARY OF THE INVENTION

Accordingly, it is an object of the present invention to provide a mobile communication system which can distribute traffic without increasing base station facilities and requiring complicated and cumbersome control, thereby providing stable communication services, and a base station and base station controller which can implement the mobile communication system.

According to one aspect of the present invention, there is provided a mobile communication system in which a plurality of base stations are distributed such that a communication range of each base station overlaps communication ranges of other adjacent base stations, and handoff control for a mobile station communicating through one of the plurality of base stations is performed on the basis of reception powers in the mobile station which are related to predetermined signals output from the respective base stations, the system comprising: means for determining a base station that should take charge of the mobile station, for which the handoff control is to be performed, on the basis of reception powers in the mobile station which are related to predetermined signals output from the respective base stations and traffic amounts in the respective base stations; and means for performing handoff control to allow the mobile station to perform communication through the determined base station.

In the above system, the base station determination means preferably selects a base station on the basis of priority values obtained by adding predetermined correction values corresponding to the traffic amounts in the respective base stations to reception power values, in the mobile station for which handoff control is to be performed, which are related to the predetermined signals output from the respective base stations. In this case, the base station determination means may adopt, as a priority value, a reception power value in the mobile station which is related to a predetermined signal output from a base station whose traffic amount is smaller than a predetermined value.

The above system may further comprise correction value generating means for generating a correction value that changes with a delay upon a change in traffic in each base station, and the base station determination means may use the correction value generated by the correction value generating means to select a base station.

The above system may further comprise correction value generating means having a conversion table for converting a traffic amount in each base station into a predetermined correction value, and the base station determination means may use the correction value generated by the correction value generating means to select a base station.

In the above system, the handoff control means may be prepared in each of the plurality of base stations and perform handoff control for a mobile station communicating through the base station in which the handoff control means is provided. In this case, the above system may further comprise a control station for collectively controlling the plurality of base stations, the control station comprising traffic amount notification means for notifying each of the plurality of base stations of traffic amounts in the remaining base stations. The traffic amount notification means may notify the number of available traffic channels in the remaining base stations.

According to another aspect of the present invention, there is provided a base station used in a mobile communication system in which a plurality of base stations are distributed such that a communication range of each base station overlaps communication ranges of other adjacent base stations, and handoff control for a mobile station communicating through one of the plurality of base stations is performed on the basis of reception powers in the mobile station which are related to predetermined signals output from the respective base stations, the base station comprising: means for determining a base station that should take charge of the mobile station, for which the handoff control is to be performed, on the basis of reception powers in the mobile station which are related to predetermined signals output from the respective base stations and traffic amounts in the respective base stations; and means for performing handoff control to allow the mobile station to perform communication through the determined base station.

In the above base station, the base station determination means preferably selects a base station on the basis of priority values obtained by adding predetermined correction values corresponding to the traffic amounts in the respective base stations to reception power values, in the mobile station for which handoff control is to be performed, which are related to the predetermined signals output from the respective base stations. In this case, the base station determination means may adopt, as a priority value, a reception power value in the mobile station which is related to a predetermined signal output from a base station whose traffic amount is smaller than a predetermined value.

The system may further comprise correction value generating means for generating a correction value that changes with a delay upon a change in traffic in each base station, and the base station determination means may use the correction value generated by the correction value generating means to select a base station.

The system may further comprise correction value generating means having a conversion table for converting a traffic amount in each base station into a predetermined correction value, and the base station determination means may use the correction value generated by the correction value generating means to select a base station.

According to still another aspect of the present invention, there is provided a base station controller used in a control station for collectively controlling a plurality of base stations in a mobile communication system in which the plurality of base stations are distributed such that a communication range of each base station overlaps communication ranges of other adjacent base stations, and handoff control for a mobile station communicating through one of the plurality of base stations is performed on the basis of reception powers in the mobile station which are related to predetermined signals output from the respective base stations, the base station controller comprising: means for managing traffic amounts in the respective base stations; and traffic amount notification means for, in response to a request from any one of the plurality of base stations, notifying the base station as a request source of the traffic amounts in the remaining base stations, the traffic amounts being used with the reception powers to determine a base station that should take charge of the mobile station for which the handoff control is to be performed.

In the above base station controller, the traffic amount managing means may manage the number of available traffic channels in each base station.

In the above base station controller, the traffic notification means may notify the number of available traffic channels in the remaining base stations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

The embodiments of the present invention will be described below with reference to the views of the accompanying drawing.

<First Embodiment>

Figure 3:
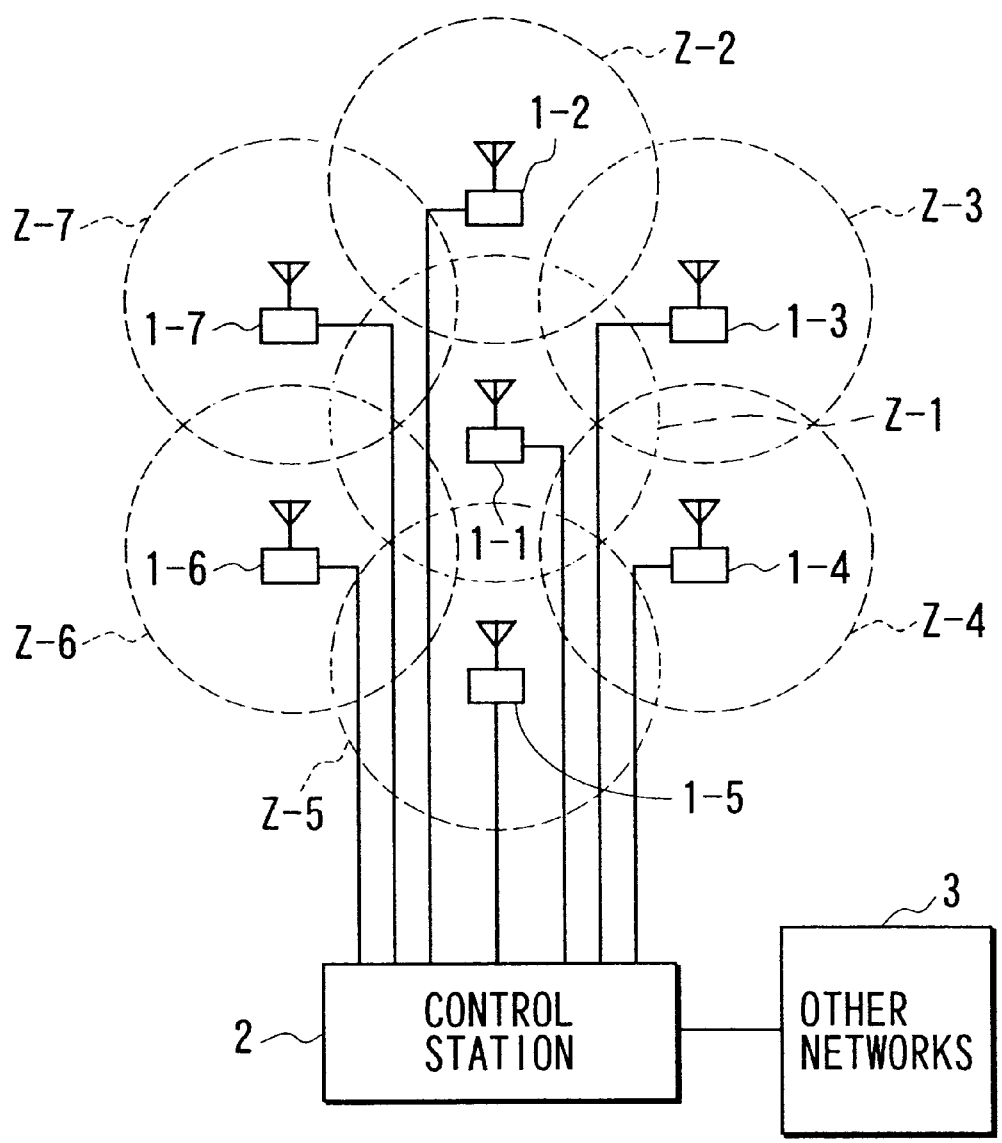
FIG. 3 is a block diagram showing the schematic arrangement of the main part of a mobile communication system according to the first embodiment of the present invention.

FIG. 3 shows the schematic arrangement of the main part of a mobile communication system according to the first embodiment of the present invention.

As shown in FIG. 3, in the mobile communication system of this embodiment, many base stations 1 (1-1 to 1-7) are distributed such that each of the communication enable ranges Z (Z-1 to Z-7) overlaps the communication enable ranges Z of other adjacent base stations 1. Note that FIG. 3 shows only the base station 1-1 and the six base stations 1-2 to 1-7 adjacent to the base station 1-1 of the base stations 1, and the respective communication enable ranges are denoted by reference symbols Z-1 to Z-7.

The respective base stations 1 are commonly connected to a control station 2. Other networks 3 such as an ISDN and a PSTN are also connected to the control station 2. Each base station 1 is arbitrarily connected to other base stations 1 and the other networks 3 through the control station 2 to allow a mobile station located in its communication enable range to communicate with other communication terminals accommodated in other base stations 1 and the other networks 3.

Figure 4:
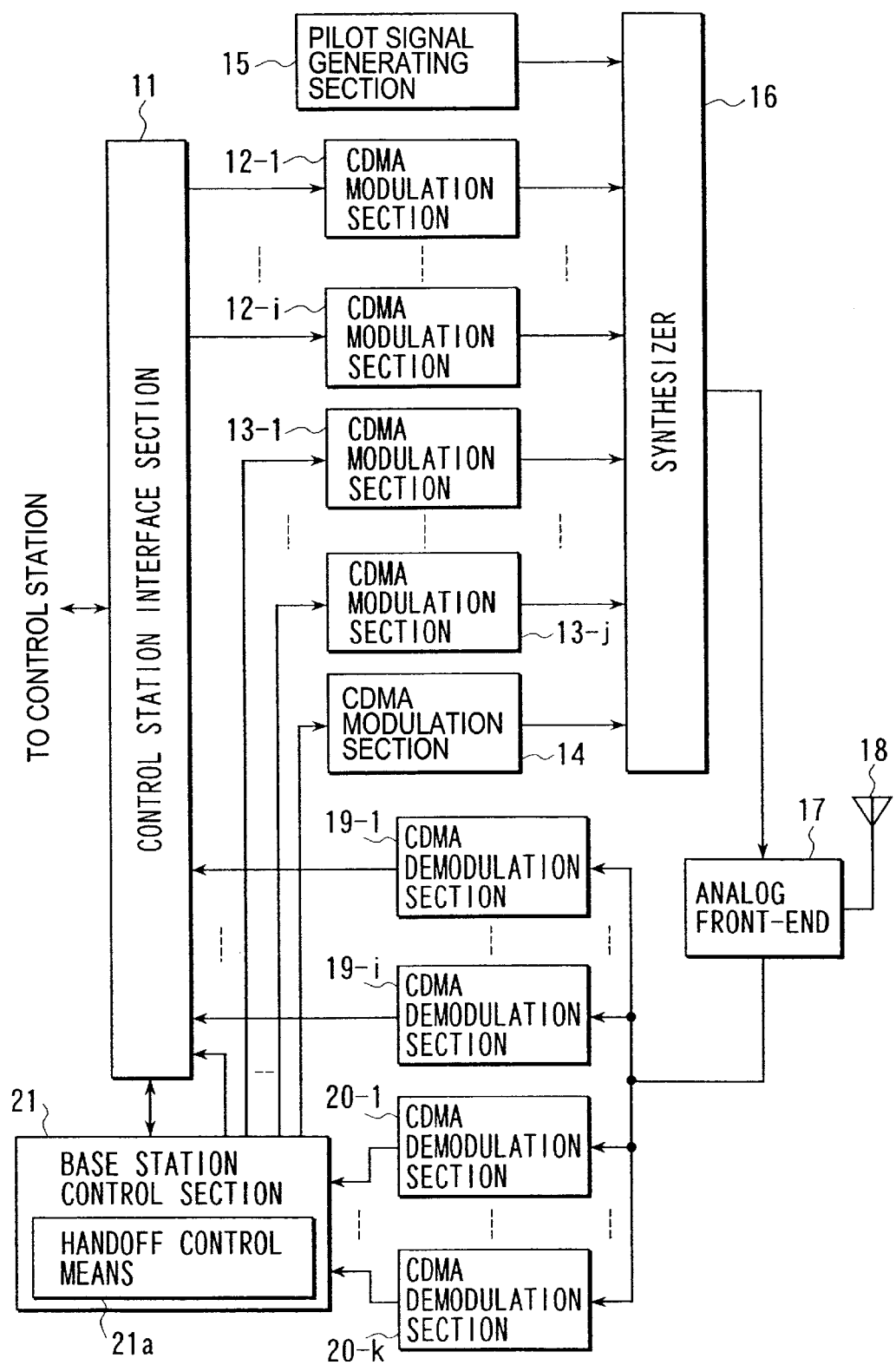
FIG. 4 is a functional block diagram showing the arrangement of each base station in the first embodiment of the present invention.

FIG. 4 is a functional block diagram showing the arrangement of each base station 1.

As shown in FIG. 4, the base station includes a control station interface section 11, CDMA modulation sections 12 (12-1 to 12-i) for i traffic channels, CDMA modulation sections 13 (13-1 to 13-j) for j paging channels, a CDMA modulation section 14 for a sync channel, a pilot signal generating section 15, a synthesizer 16, an analog front-end 17, an antenna 18, CDMA demodulation sections 19 (19-1 to 19-i) for i traffic channels, CDMA demodulation sections 20 (20-1 to 20-k) for k access channels, and a base station control section 21.

The control station interface section 11 transmits/receives speech data and control data to/from the control station 2. Upon reception of time-divisionally multiplexed speech data from the control station 2, the control station interface section 11 demultiplexes the data, and inputs the resultant data to the CDMA modulation sections 12 for the corresponding traffic channels. The speech data output from the respective CDMA demodulation sections 19 are multiplexed by the control station interface section 11, together with the control data output from the base station control section 21. The resultant data is sent to the control station 2.

Each CDMA modulation section 12 has a known arrangement including a data generating circuit, a convolutional coder, an interleave circuit, a spectrum spreader, a digital filter, a D/A converter, and the like. In each CDMA modulation section 12, therefore, speech data is subjected to error detection code/error correction code addition processing, convolutional coding, interleave processing, spectrum-spreading processing, digital-to-analog signal conversion, and the like. As a result, the data is converted into an analog transmission signal. In this case, the CDMA modulation sections 12-1 to 12-i respectively use different Walsh codes corresponding to the respective down traffic channels for spectrum-spreading processing.

Each CDMA modulation section 13 has a known arrangement including a convolutional coder, an interleave circuit, a spectrum spreader, a digital filter, a D/A converter, and the like. The known paging data generated by the base station control section 21 is supplied to each CDMA modulation section 13. In each CDMA modulation section 13, therefore, the paging data is subjected to convolutional coding, interleave processing, spectrum-spreading processing, digital-to-analog signal conversion, and the like. As a result, the data is converted into an analog transmission signal. Note that the CDMA modulation sections 13-1 to 13-j respectively use different Walsh codes corresponding to the respective paging channels for spectrum-spreading processing.

The CDMA modulation section 14 has a known arrangement including a convolutional coder, an interleave circuit, a spectrum spreader, a digital filter, a D/A converter, and the like. The known sync data generated by the base station control section 21 is supplied to the CDMA modulation section 14. In the CDMA modulation section 14, therefore, the sync data is subjected to convolutional coding, interleave processing, spectrum-spreading processing, analog-to-digital signal conversion, and the like. As a result, the data is converted into an analog transmission signal. Note that the CDMA modulation section 14 uses a Walsh code for a sync channel in spectrum-spreading processing.

The pilot signal generating section 15 spreads known pilot data including a PN code, which is commonly used by the CDMA modulation sections 12, 13, and 14 to perform spectrum-spreading processing of a pilot channel with a Walsh code, and converts the resultant data into an analog signal, thereby generating a pilot signal.

The analog transmission signals obtained by the respective CDMA modulation sections 12, 13, and 14 and the pilot signal are synthesized with each other by the synthesizer 16.

The output signal from the synthesizer 16 is input to the analog front-end 17 to be up-converted into a signal having a predetermined radio frequency. In addition, the signal is amplified to a predetermined transmission power level. The resultant signal is then transmitted from the antenna 18 to a mobile station.

The radio signal received through the antenna 18 is amplified by the analog front-end 17 with low noise. Thereafter, signals in the respective radio frequency bands assigned to the corresponding base station 1 are extracted. Each signal is then down-converted into a signal having an intermediate or baseband frequency.

The reception signals output from the analog front-end 17 are respectively branched/input to the CDMA demodulation sections 19-1 to 19-i and the CDMA demodulation sections 20-1 to 20-k.

Each CDMA demodulation section 19 has a known arrangement including an A/D converter, a searcher,. an automatic gain control circuit, a finger circuit, a symbol synthesizer, a de-interleave circuit, a Viterbi decoder, an error correction circuit, and the like. In the CDMA demodulation section 19, therefore, a reception signal is subjected to analog-to-digital signal conversion, de-spreading processing, integration processing for a 1-symbol interval, symbol synthesis, de-interleave processing, Viterbi decoding, error correction processing, and the like. As a result, each signal is converted into reception data. The respective reception data are input parallel to the control station interface section 11. Note that the CDMA demodulation sections 19-1 to 19-i use different Walsh codes corresponding to the respective up traffic channels for de-spreading processing. As a result, each CDMA demodulation section 19 extracts the reception data that has arrived through a corresponding up traffic channel.

Each CDMA demodulation section 20 has a known arrangement including an A/D converter, a searcher, an automatic gain control circuit, a finger circuit, a symbol synthesizer, a de-interleave circuit, a Viterbi decoder, an error correction circuit, and the like. In the CDMA demodulation section 20, therefore, a reception signal is subjected to analog-to-digital signal conversion, de-spreading processing, integration processing for a 1-symbol interval, symbol synthesis, de-interleave processing, Viterbi decoding, error correction processing, and the like. As a result, each signal is converted into reception data. The respective reception data are input parallel to the base station control section 21. Note that the CDMA demodulation sections 20-1 to 20-k use different Walsh codes corresponding to the respective access channels for de-spreading processing. As a result, each CDMA demodulation section 20 extracts the reception data that has arrived through a corresponding access channel.

The base station control section 21 establishes paths using down and up traffic channels in cooperation with the control station 2 while communicating with mobile stations through paging and access channels, thereby allowing the mobile stations to perform communication.

This base station control section 21 is mainly formed from, for example, a microprocessor, and has handoff control means 21a in addition to various general control means associated with the operation of the base station described above. The handoff control means 21a performs control processing to dynamically change the degree of facilitating handoff processing in consideration of the number of available traffic channels in each base station 1, in addition to the reception electric field strength (pilot reception power value) of the pilot signal sent from each base station 1 to each mobile station, which is notified from each mobile station.

Various physical quantities, e.g., RSSI (Received Signal Strength Indicator), SI (Signal Interference), Eb/No (Energy/Noise), and SNR (Signal-to-Noise Ratio), are conceivable as physical quantities to express a reception power in this embodiment, and any one of them can be used.

Figure 5:
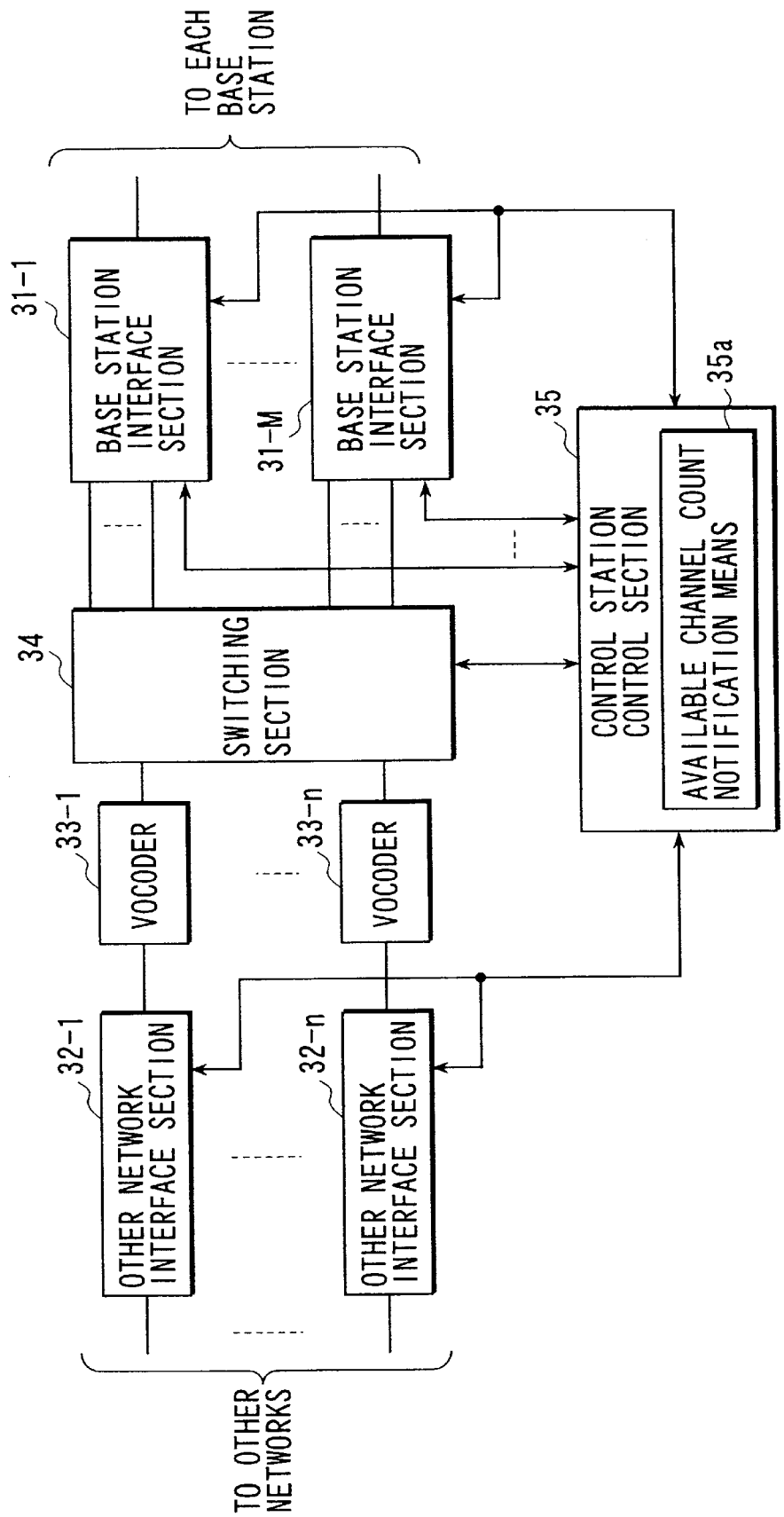
FIG. 5 is a functional block diagram showing the arrangement of a base station controller installed in a control station in the first embodiment of the present invention.

FIG. 5 is a functional block diagram showing the arrangement of a base station controller installed in the control station 2.

As shown in FIG. 5, the base station controller includes m base station interface sections 31 (31-1 to 31-m), n other network interface sections 32 (32-1 to 32-n), n vocoders 33 (33-1 to 33-n), a switching section 34, and a control station control section 35.

One base station 1 is connected to each base station interface section 31, which transmits/receives speech data and control data to/from the corresponding base station 1. Upon reception of time-divisionally multiplexed speech data and control data corresponding to i channels from the base station 1, the base station interface section 31 demultiplexes the data and inputs each speech data to the switching section 34, and the control data to the control station control section 35. The respective speech data output from the switching section 34 are multiplexed with each other by the base station interface section 31, together with the control data output from the control station control section 35. The resultant data is sent to each base station 1.

The other network interface sections 32 are respectively connected to the other networks 3 through communication lines accommodated therein. The vocoders 33 are connected to the other network interface sections 32. The other network interface sections 32 are used to receive speech signals sent through the other networks 3, send speech signals to the other networks 3, and perform network control processing. The speech signals sent through the other networks 3 are received by the other network interface sections 32 to be supplied to the respective vocoders 33. The speech signals output from the vocoders 33 are sent to the other networks 3 through the corresponding other network interface sections 32.

The vocoders 33 are paired with the other network interface sections 32. The vocoder 33 encodes the speech signals output from the corresponding other network interface sections 32 into speech data, and supply them to the switching section 34. In addition, the vocoders 33 decode the speech data output from the switching section 34 to the corresponding other network interface sections 32 to convert them into speech signals, and supply them to the corresponding other network interface sections 32.

The switching section 34 sets paths by switching/connecting arbitrarily pairs of the respective channels handled by the base station interface sections 31 and the other network interface sections 32 under the control of the control station control section 35.

The control station control section 35 implements the function of setting an arbitrary path by collectively controlling the respective portions of the above base station controller, and performs control processing for the base stations 1 by supplying control data to the base stations 1.

The control station control section 35 is mainly formed from, for example, a microprocessor, and includes an available channel count notification means 35a in addition to various general control means associated with the operation of the base station controller described above. The available channel count notification means 35a manages the number of available traffic channels (available channel count) in each base station 1, and notifies the base station 1 of corresponding information, as needed.

The operation of the mobile communication system having the above arrangement will be described next.

In the CDMA mobile communication system, a mobile station under communication measures the pilot reception power at a predetermined timing, and notifies the base station 1 to which the radio path is connected of the measured pilot reception power value. Note that if a pilot channel of another base station 1 can be received by the corresponding mobile station, the pilot reception power value associated with this base station 1 is notified to the base station 1 to which the above radio path is connected, in addition to the above notified pilot reception power value associated with the base station 1 to which the radio path is connected.

Figure 6:
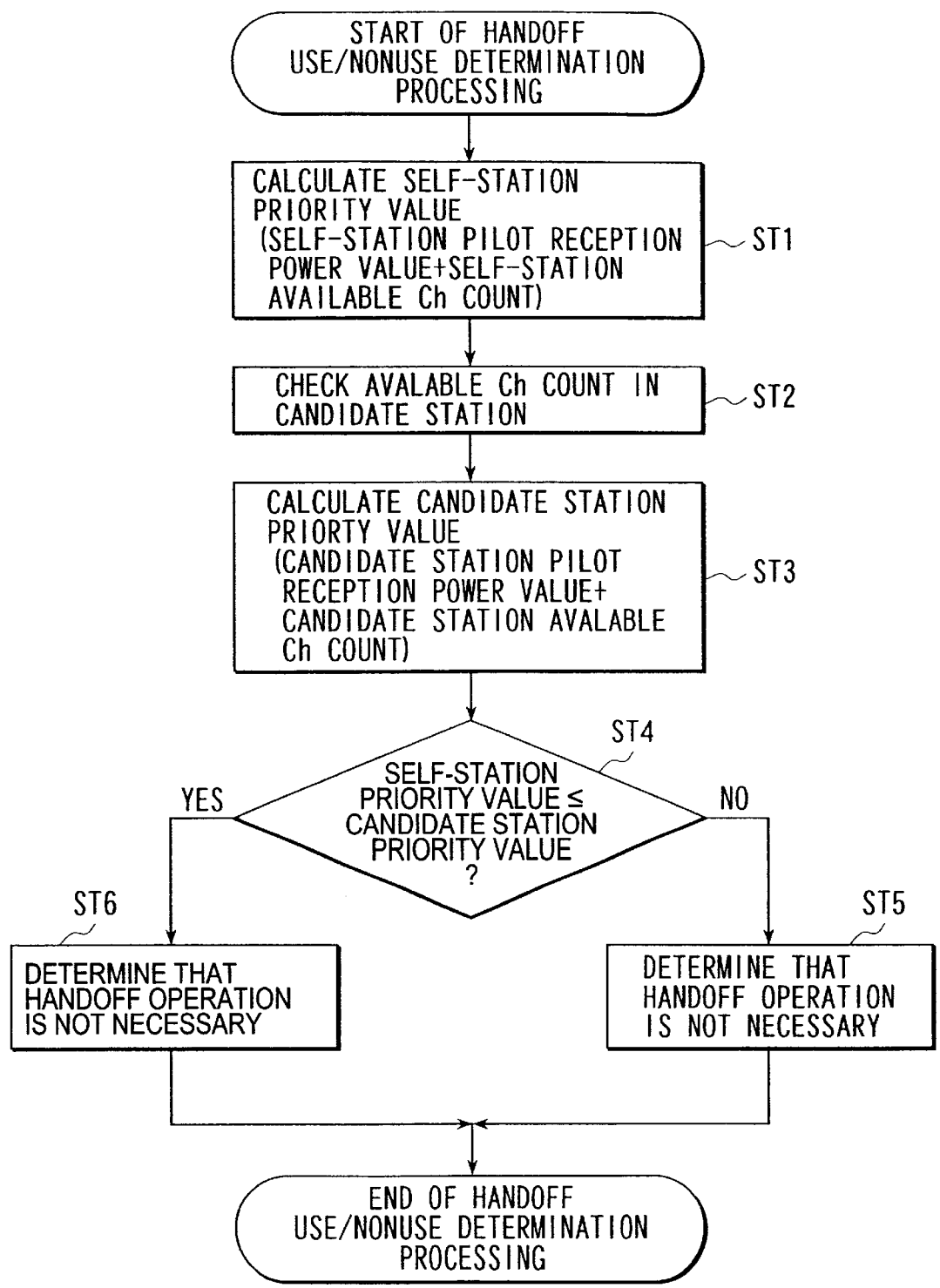
FIG. 6 is a flow chart showing a procedure by which a base station control section performs handoff use/nonuse determination processing in the first embodiment of the present invention.

In the base station 1, in response to the notification of such pilot reception power values, the base station control section 21 of the base station executes handoff use/nonuse determination processing by using the handoff control means 21a, as shown in FIG. 6.

First of all, the base station control section 21 calculates the sum of the pilot reception power value associated with the self-station and notified from the mobile station and the number of available traffic channels (to be referred to as an available channel count hereinafter) of the self-station, and sets it as a self-station priority value (step ST1).

Subsequently, the base station control section 21 sets the base station 1 other than the self-station corresponding to the pilot reception power value notified from the mobile station as a candidate station as a handoff destination, and determines the available channel count of this candidate station (step ST2).

For example, the available channel count of this candidate station is determined as follows. The base station control section 21 sends control data for requesting the notification of the available channel count of the candidate station to the control station 2 through the control station interface section 11. In the control station 2, the control station control section 35 periodically causes each base station 1 to check the available channel count in each base station 1, thereby managing the latest available channel count in each base station 1. Upon reception of the control data from the base station 1 through the base station interface section 31 corresponding to the base station 1, the control station control section 35 causes the available channel count notification means 35a to generate control data for notifying the designated base station 1 of the available channel count. This control data is sent to the base station 1 as the request source through the base station interface section 31 corresponding to the base station 1 as the request source. The base station control section 21 receives the control data for notifying the available channel count through the control station interface section 11, and recognizes this control data, thereby determining the available channel count of the candidate station.

The base station control section 21 calculates the sum of the pilot reception power value associated with the candidate station and notified from the mobile station and the available channel count of the candidate station determined in step ST2, and. sets it as a candidate station priority value (step ST3)

The base station control section 21 compares the self-station priority value calculated in step ST1 with the candidate station priority value calculated in step ST3, and checks whether the self-station priority value is smaller than the candidate station priority value (step ST4).

If the self-station priority value is larger than the candidate station priority value, the base station control section 21 determines that handoff processing is not required (step ST5). The base station control section 21 determines that handoff processing is required, only when the self-station priority value is equal to or smaller than the candidate priority value (step ST6).

Upon completion of the determination processing in step ST5 or ST6, the base station control section 21 terminates this handoff use/nonuse determination processing. If the base station control section 21 determines that handoff processing is necessary, the base station control section 21 performs handoff processing by a known procedure to change the base station 1, to which the mobile station that has notified the pilot reception power value connects a radio path, from the self-station to the candidate station.

Assume that a given mobile station is located between the base stations A and B, and the measured pilot reception power values associated with the base stations A and B are respectively "100" and "70". In this case, according to the prior art, the base station A is the target station to which the mobile station is to set a radio path. With the above processing, in this embodiment, the base station B may be the target station to which the mobile station is to set a radio path depending on the relationship between the available channel count of the base station A and the available channel count of the base station B.

Figure 7:
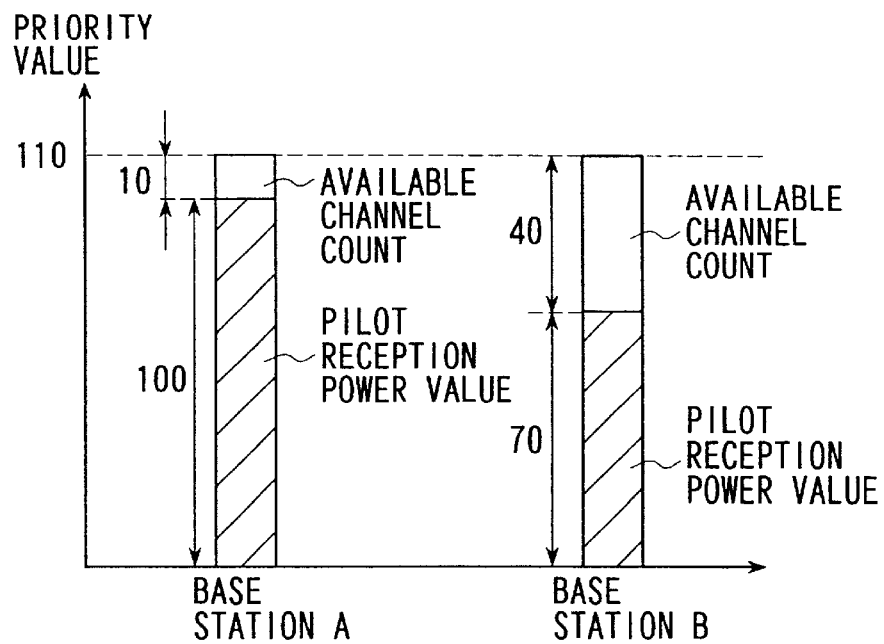
FIG. 7 is a graph showing an example of a condition under which the priority values associated with two base stations become equal.

Assume that the available channel count of the base station A is "10", and that of the base station B is "40". In this case, if, for example, "100" and "70" are respectively measured as the pilot reception power values associated with the base stations A and B, both the priority values associated with the base stations A and B become "110", i.e., equal to each other, as shown in FIG. 7.

If the pilot reception power or available channel count associated with the base station A decreases in this state, since the priority value associated with the station B becomes larger than that associated with the base station A, the target station to which the mobile station sets a radio path becomes the base station B.

In contrast to this, if the pilot reception power or available channel count associated with the base station B decreases in this state, since the priority value associated with the station A becomes larger than that associated with the base station B, the target station to which the mobile station sets a radio path becomes the base station A.

Figure 8:
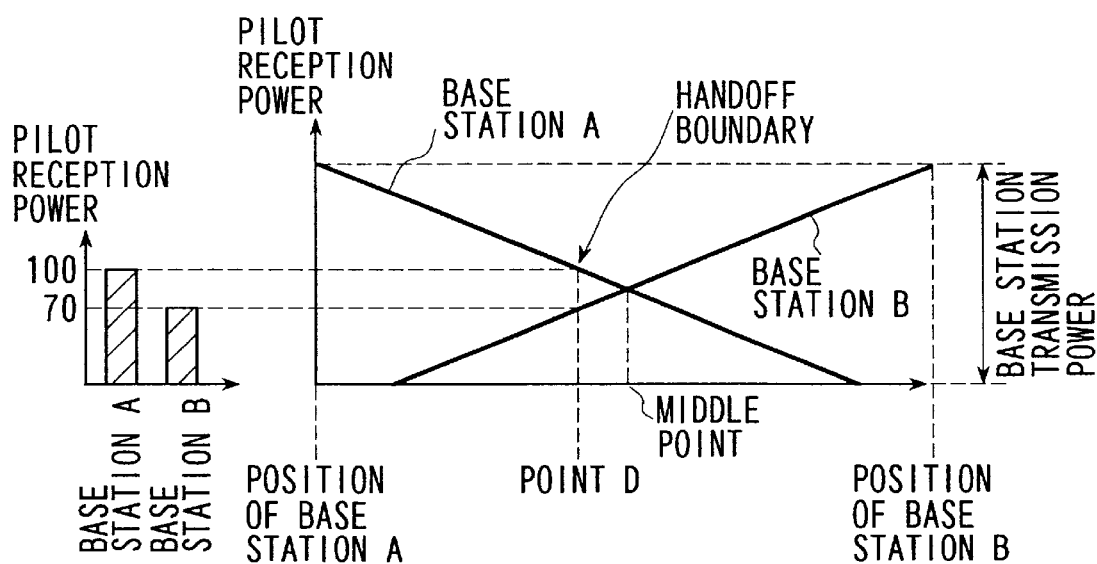
FIG. 8 is a graph showing an example of the position of the handoff boundary set by the mobile communication system according to the first embodiment of the present invention.

If the available channel count of the base station A is "10", and the available channel count of the base station A is "40", a point D becomes a handoff boundary where the pilot reception power value associated with the base station A is "100" and the pilot reception power value associated with the base station B is "70", as shown in FIG. 8. The point D is closer to the base station A than the middle point between the base stations A and B. Assume that a mobile station is in a communication while connecting a radio path to the base station B. In this case, even if the mobile station moves to the base station A side, handoff to the base station A with a small available channel count does not easily occur. Assume that the mobile station is in a communication while connecting a radio path to the base station A. In this case, if the mobile station moves to the base station B side, handoff to the base station B with a large available channel count easily occurs.

Figure 1:
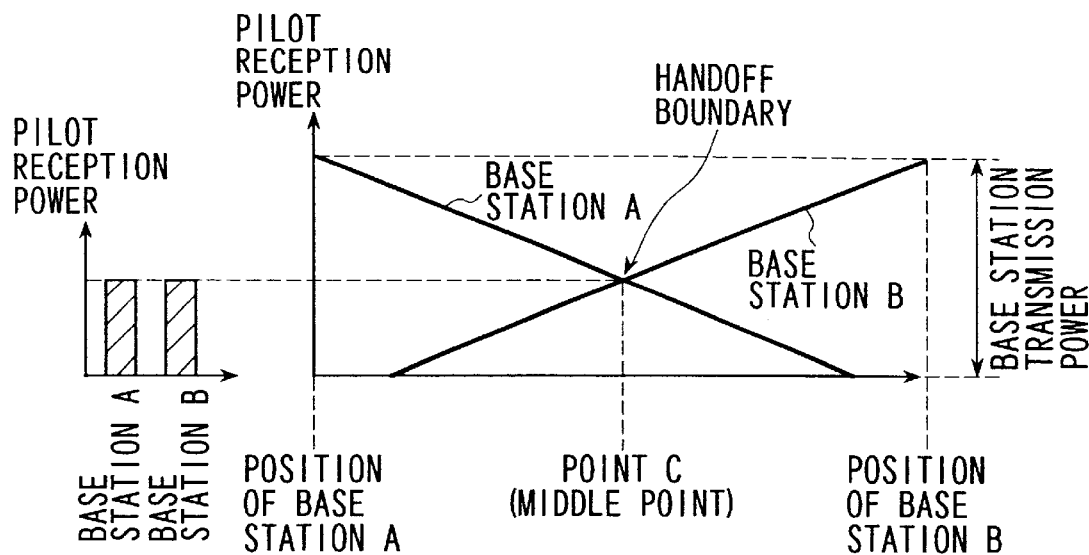
FIG. 1 is a view showing the distribution of pilot reception powers associated with two adjacent base stations which transmit pilot channels with the same transmission power.
Figure 2:
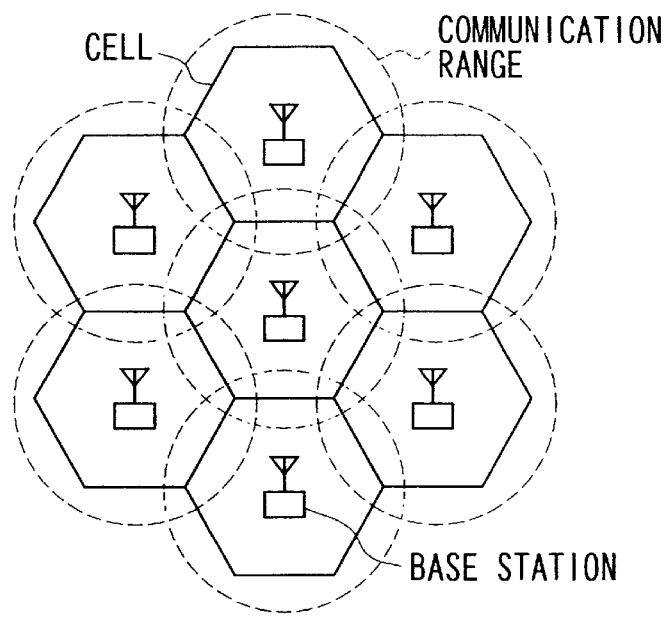
FIG. 2 is a view showing a general cell arrangement in a cellular mobile communication system.
Figure 9:
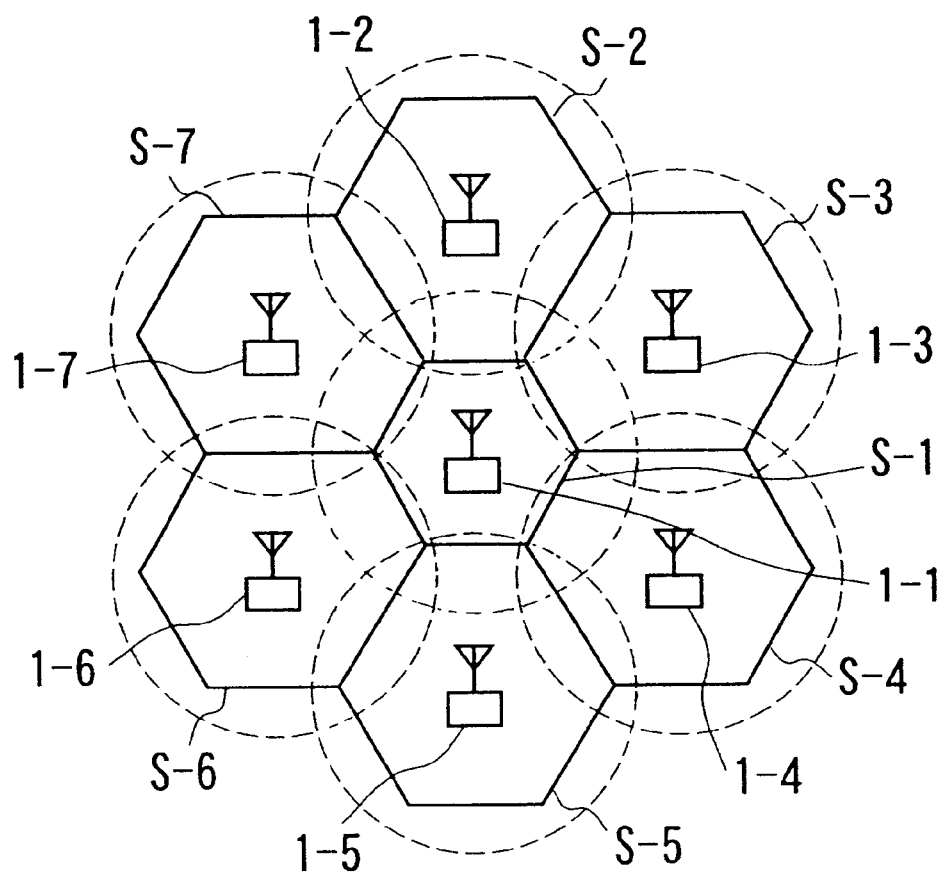
FIG. 9 is a view showing an example of a cell arrangement in a state wherein traffic concentrates on a base station.

Consequently, if, for example, the available channel counts of the base stations 1-1 to 1-7 in FIG. 3 are equal to each other, the sizes of the cells formed by the respective base stations 1 are equal to each other as in the case of the conventional cells in FIG. 2. If, for example, the available channel count of the base station 1-1 is smaller than that of each of the adjacent base stations 1-2 to 1-7 in FIG. 3, i.e., the traffic is concentrating on the base station 1-1, cells S-2 to S-7 formed by the base stations 1-2 to 1-7 extend toward the base station 1-1, and a cell S-1 formed by the base station 1-1 reduces, as shown in FIG. 9.

The traffic concentrating on the base station 1-1 is therefore distributed to the adjacent base stations 1-2 to 1-7, thus reducing the traffic concentration.

Furthermore, in this embodiment, the changing of the sizes of cells is realized by changing the determination condition for determining whether the handoff processing is performed. This processing can therefore be implemented by only slightly changing software processing. This makes it possible to minimize increases in facilities and complexity and cumbersomeness of processing.

<Second Embodiment>

The second embodiment of the present invention will be described next.

A mobile communication system according to this embodiment has the same arrangement as that of the first embodiment. The operation of the second embodiment is almost the same as that of the first embodiment except that the contents of handoff use/nonuse determination processing are changed as follows.

Figure 10:
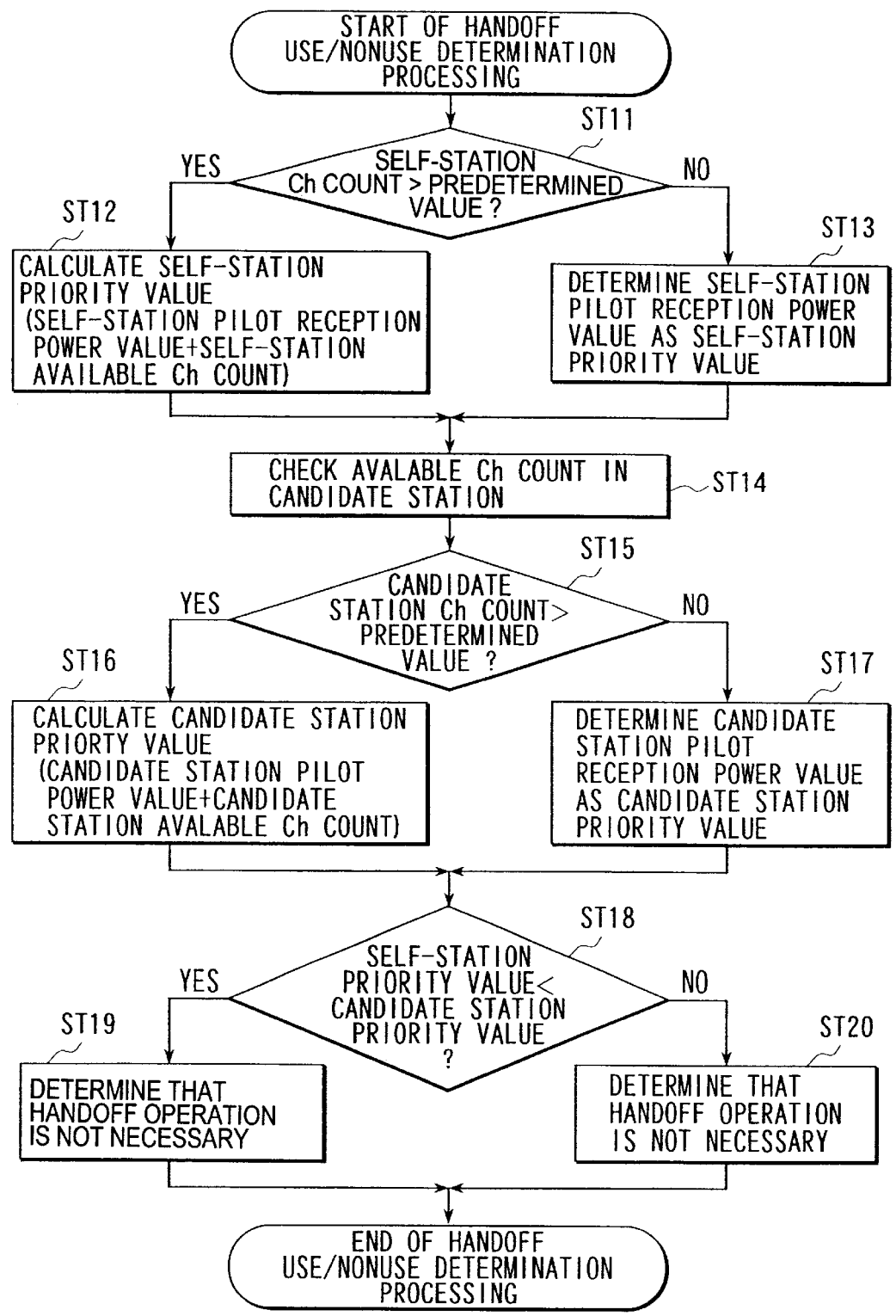
FIG. 10 is a flow chart showing a procedure by which a base station control section performs handoff use/nonuse determination processing in the second embodiment of the present invention.

A base station control section 21 in this embodiment causes a handoff control means 21a to execute handoff use/nonuse determination processing in accordance with the notification of a pilot reception power value, as shown in FIG. 10.

In this handoff use/nonuse determination processing, first of all, the base station control section 21 checks whether the available channel count of the self-station is equal to or smaller than a predetermined value (step ST11).

If it is determined that the available channel count of the self-station is larger than the predetermined value, the base station control section 21 calculates the sum of the pilot reception power value associated with the self-station and notified from the mobile station and the available channel count of the self-station, and sets it as a self-station priority value as in the first embodiment described above (step ST12). If the available channel count of the self-station is equal to or smaller than the predetermined value, the base station control section 21 sets the notified pilot reception power value associated with the self-station as a self-station priority value (step ST13).

Subsequently, the base station control section 21 checks the available channel count of a candidate station as in the first embodiment (step ST14) to determine whether the available channel count of this candidate station is equal to or smaller than the predetermined value (step ST15).

If it is determined that the available channel count of the candidate station is larger than the predetermined value, the base station control section 21 calculates the sum of the pilot reception power value associated with the candidate station and notified from the mobile station and the available channel count of the candidate station, and sets it as a candidate station priority value (step ST16). If, however, the available channel count of the candidate station is equal to or smaller than the predetermined value, the base station control section 21 sets the notified pilot reception power value associated with the candidate station as a candidate station priority value (step ST17).

The base station control section 21 compares the self-station priority value calculated in step ST12 or ST13 with the candidate station priority value calculated in step ST16 or ST17 to determine whether the self-station priority value is smaller than the candidate station priority value (step ST18).

If it is determined that the self-station priority value is equal to or larger than the candidate station priority value, the base station control section 21 determines that handoff processing is not necessary (step ST19), and determines that handoff processing is necessary, only when the self-station priority value is smaller than the candidate station priority value (step ST20).

As described above, in this embodiment, only when the available channel count is smaller than the predetermined value, priority value correction based on the available channel count is performed. Therefore, the cell size of each base station 1 remains the same and is fixed in the state shown in FIG. 2 unless a certain degree of traffic concentration occurs in a specific base station 1.

In the first embodiment described above, if a mobile station in a communication frequently moves, the priority value of each base station frequently changes, and the position of each cell boundary may frequently change. In this case, handoff operation is repeatedly performed for the mobile station located near the middle position between two base stations. This may lead to an unstable communication.

In this embodiment, however, the position of a cell boundary is changed only when traffic concentration occurs to some degree in the specific base station 1 as described above, i.e., only when the traffic needs to be distributed. This can greatly reduce the possibility of the above inconvenience.

<Third Embodiment>

The third embodiment of the present invention will be described next.

The arrangement of a mobile communication system according to this embodiment is almost the same as that of the first embodiment except for the arrangement of a base station controller.

Figure 11:
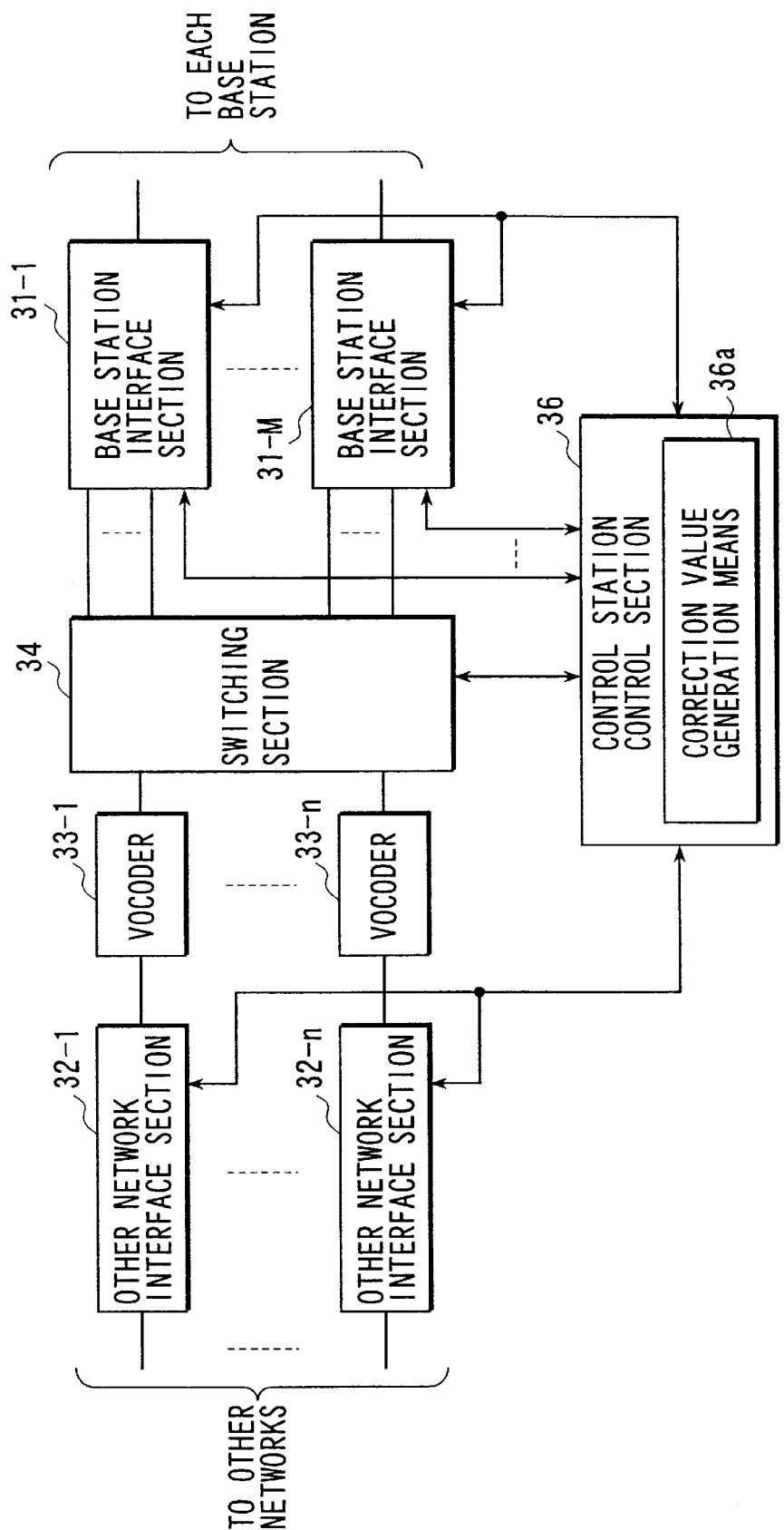
FIG. 11 is a functional block diagram showing the arrangement of a base station controller installed in a control station in the third embodiment of the present invention.

FIG. 11 is a functional block diagram showing the arrangement of the base station controller in this embodiment.

As shown in FIG. 11, the base station controller includes m base station interface sections 31 (31-1 to 31-m), n other network interface sections 32 (32-1 to 32-n), n vocoders 33 (33-1 to 33-n), a switching section 34, and a control station control section 36. That is, the base station controller in this embodiment uses the control station control section 36 in place of the control station control section 35 of the base station controller in the first embodiment.

The control station control section 36 implements an arbitrary path setting function by collectively controlling the respective portions of the base station controller described above, and performs control processing for each base station 1 by supplying control data thereto.

For example, the control station control section 36 is mainly formed from a microprocessor, and includes a correction value generating means 36a in addition to various general control means associated with the operation of the above base station controller. This correction value generating means 36a generates a value (correction value) for each base station 1, which changes with a delay upon a change in channel count on the basis of the available channel count of each base station 1, and notifies each base station 1 of this value, as needed.

The operation of the mobile communication system having the above arrangement will be described next.

Figure 12:
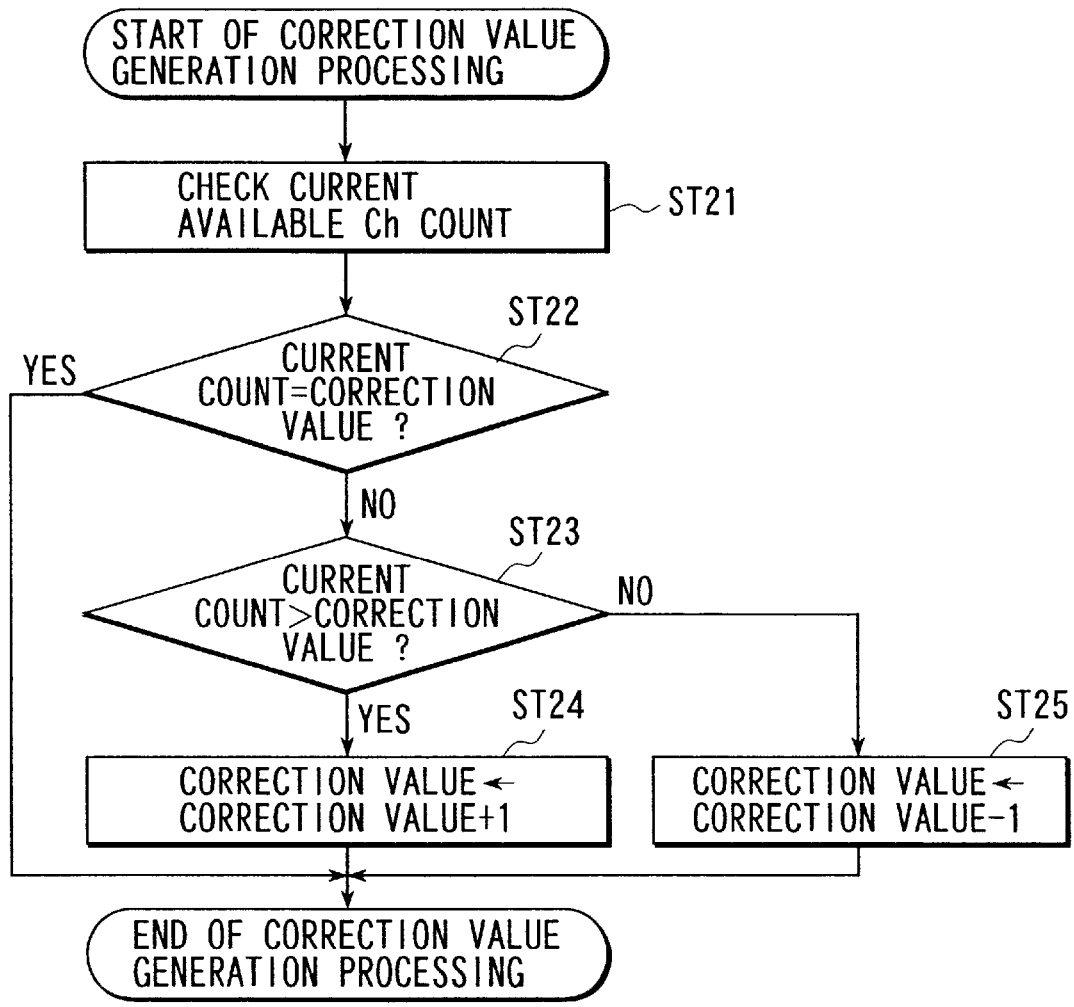
FIG. 12 is a flow chart showing a procedure by which a control station control section performs correction value generation processing in the second embodiment of the present invention.

First of all, in a control station 2, the control station control section 36 causes the correction value generating means 36a to execute correction value generation processing at predetermined time intervals (e.g., 5-sec intervals) as shown in FIG. 12. FIG. 12 shows the processing associated with one base station 1. This processing is performed for each base station 1.

In this correction value generation processing, the control station control section 36 checks the current available channel count (current count) associated with the base station 1 as a target for which a correction value is to be generated (step ST21) so as to determine whether the current count is equal to the correction value set for the target base station 1 (step ST22).

If it is determined that the current count is equal to the correction value, the control station control section 36 terminates this correction value generation processing, and keeps the correction value equal to the current count. If it is determined that the current count is different from the correction value, the control station control section 36 then determines whether the current count is larger than the correction value (step ST23). If it is determined that the current count is larger than the correction value, the control station control section 36 adds "1" to the correction value (step ST24). If it is determined that the current count is equal to or smaller than the correction value, the control station control section 36 subtracts "1" from the correction value (step ST25).

The above correction value generation processing is repeated at predetermined intervals. With this operation, when the correction value differs from the current count, the correction value is changed toward the current count "1" at a time at the predetermined intervals until the current count becomes equal to the correction value.

Figure 13:
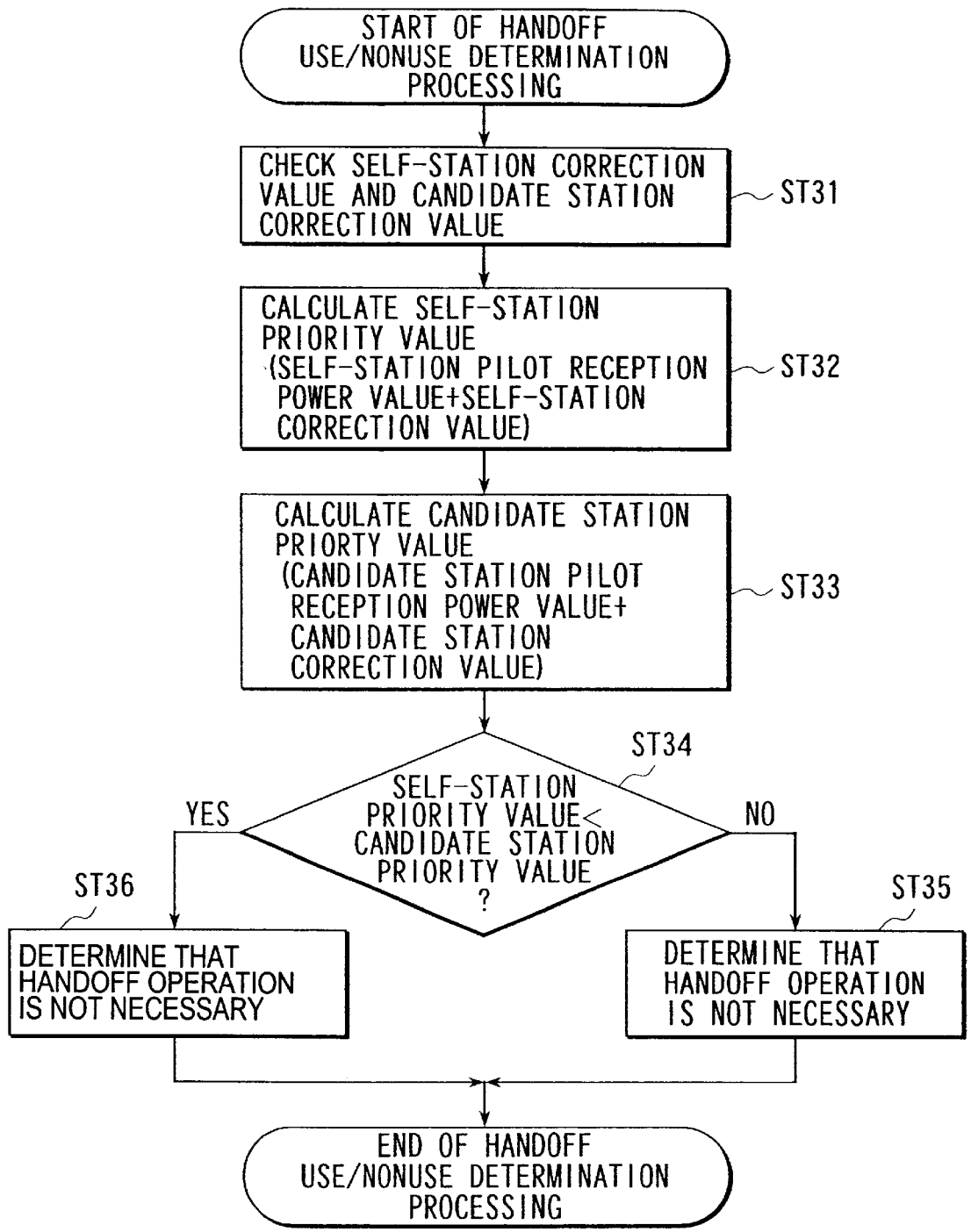
FIG. 13 is a flow chart showing a procedure by which a base station control section performs handoff use/nonuse determination processing in the third embodiment of the present invention.

In response to the notification of a pilot reception power value, a base station control section 21 causes a handoff control means 21a to execute handoff use/nonuse determination processing as shown in FIG. 13.

In this handoff use/nonuse determination processing, the base station control section 21 checks correction values for a self-station and candidate station (step ST31).

For example, determination on this self-station correction value and candidate station correction value is performed as follows. The base station control section 21 sends control data for requesting the notification of self-station and candidate station correction values to the control station 2 through a control station interface section 11. In the control station 2, upon reception of the control data sent from the base station 1 through the base station interface section 31 corresponding to the base station 1, the control station control section 36 generates control data for notifying the correction value determined by the above correction value generation processing for the designated base station 1, and sends the data to the base station 1 as the request source through the base station interface section 31 corresponding to the base station 1 as the request source. The base station control section 21 receives the control data for notifying this correction value through the control station interface section 11, and recognizes the control data, thereby checking the self-station and candidate station correction values.

Subsequently, the base station control section 21 calculates the sum of the pilot reception power value associated with the self-station and notified from the mobile station and the self-station correction value determined in step ST31, and sets it as a self-station priority value (step ST32). The base station control section 21 also calculates the sum of the pilot reception power value associated with the candidate station and notified from the mobile station and the candidate station correction value determined in step ST31, and sets it as a candidate station priority value (step ST33).

The base station control section 21 then compares the self-station priority value calculated in step ST32 with the candidate station priority value calculated in step ST33 to determine whether the self-station priority value is smaller than the candidate station priority value (step ST34).

If it is determined that the self-station priority value is equal to or larger than the candidate station priority value, the base station control section 21 determines that handoff operation is not necessary (step ST35), and determines that handoff operation is necessary, only when the self-station priority value is smaller than the candidate station priority value (step ST36).

When the determination processing in step ST35 or ST36 is complete, the base station control section 21 terminates this handoff use/nonuse determination processing. If it is determined that handoff operation is necessary, handoff processing is executed by a known procedure to change the base station 1, to which the mobile station that has notified the pilot reception power value connects a radio path, from the self-station to the candidate station.

In this embodiment, as in the first embodiment, traffic can be distributed by changing the size of each cell S in accordance with the traffic amount.

Figures 14, 15, 16A, 16B:
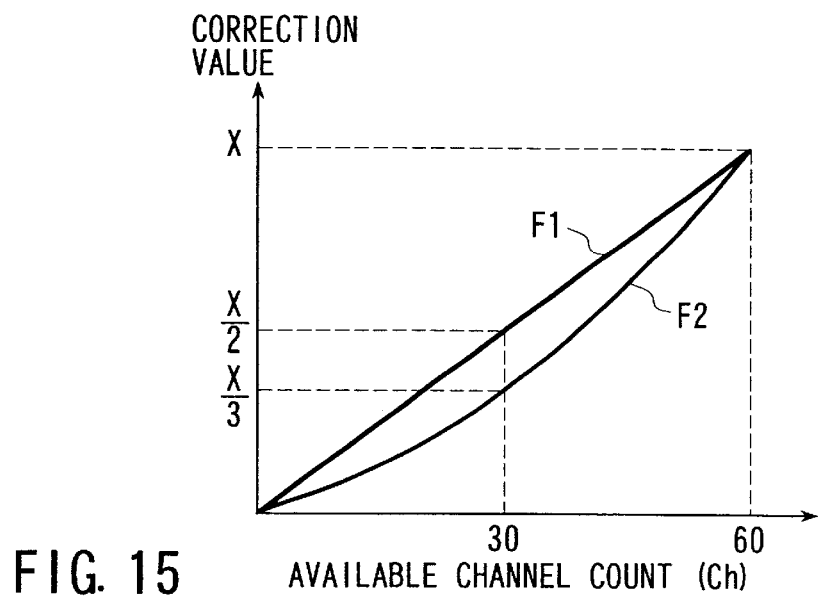
FIG. 14 is a view showing an example of how the correction value changes in the third embodiment of the present invention.
FIG. 15 is a graph for explaining functions for converting available channel counts into correction values.
FIGS. 16A and 16B are views for explaining tables for converting available channel counts into correction values.

In addition, according to this embodiment, even if the traffic amount associated with a given mobile station 1 abruptly changes, the priority value associated with the base station 1 gradually changes. Assume that both the base stations A and B have an available channel count of 30, and "30" is set as a correction value for each base station. Even if the traffic in the base station B abruptly increases, and the available channel count of the base station B become five, the correction value "30" for the base station B is not changed at this time. If the execution cycle of correction value generation processing is 5 sec, and the available channel count of the base station B remains the same, the correction. value from the base station B gradually changes, as shown in FIG. 14. After a lapse of 125 sec, the correction value becomes "5", which is equal to the available channel count.

Even if, therefore, the traffic amount associated with a given base station 1 abruptly changes, the size of each cell is gradually changed. This can therefore prevent an unstable state wherein the position of the cell boundary frequently changes, and handoff operation is repeated for the mobile station located near the middle position between two base stations.

The present invention is not limited to the embodiments described above. For example, when one sector is divided into a plurality of sectors, traffic can be reflected in control in units of sectors.

In each embodiment described above, an available channel count is used as a traffic amount. However, other information such as the number of channels in use or channel utilization ratio can be used.

In each embodiment described above, for the sake of descriptive convenience, a priority value is obtained by simply adding an available channel count to a pilot reception value. However, an available channel count and a pilot reception power value are values in different spheres. Therefore, a proper priority value may not be obtained by simply adding these values. For this reason, the degrees of influence of an available channel count and pilot reception power value on a priority value may be optimized by multiplying at least the available channel count or pilot reception power value by a coefficient that is set to optimize the priority value.

An available channel count may be converted into a predetermined value (correction value) by using a conversion table instead of the above coefficient, and a priority value may be obtained by adding this correction value to a pilot reception power value. In this case, for example, the conversion table is provided in the base station control section 21, and conversion from an available channel count into a predetermined correction value is performed in accordance with a function F1 or F2 in FIG. 15. The function F2 is expressed as a curve in FIG. 15. In practice, however, this function cannot be expressed as a curve in a strict sense because predetermined correction values are made to correspond to the respective channel counts (integers).

According to the function F1, the correction value changes in proportion to the available channel count. When, for example, the available channel count is "60", the correction value becomes "X", and when the available channel count is "30", the correction value becomes "X/2".

According to the function F2, if the available channel count is relatively small, the correction value to be added to the pilot reception power value is kept small. More specifically, when the available channel count is "60", the correction value is "X" as in the case of a straight line L. When, however, the available channel count becomes "30", the correction value becomes "X/3", which is smaller than that in the case of the straight line L. With the use of this function F2, the position of a cell boundary is not frequently changed while excessive traffic concentration does not occur in a specific base station, i.e., traffic distribution need not be performed, thereby allowing stable communication.

In each embodiment described above, each base station 1 has the handoff control means. However, the control station 2 may have the handoff control means. Alternatively, each base station 1 and the control station 2 may be implemented as independent stations.

In each embodiment described above, the present invention is applied to the CDMA mobile communication system. However, the present invention can be applied to TDMA (Time Division Multiple Access) and FDMA (Frequency Division Multiple Access) mobile communication systems.

Various changes and modifications can be made within the spirit and scope of the invention.

As has been described above, according to the present invention, for example, a base station that should take charge of a mobile station as a target for which handoff control is to be performed is determined by comparing the priority values obtained by adding predetermined correction values corresponding to the traffic amounts in a plurality of base stations to the reception power values associated with predetermined signals output from the respective base stations in the target mobile station on the basis of the reception powers associated with the predetermined signals output from the respective base stations in the target mobile station and the traffic amounts, e.g., the available channel counts, in the respective base stations. Handoff control is performed to allow the mobile station to perform communication through this base station.

According to another aspect of the present invention, in addition to the above aspect, for a base station whose traffic amount is smaller than a predetermined value, the reception power value in a mobile station which is related to a predetermined signal output from this base station is set as a priority value.

According to still another aspect of the present invention, in addition to one of the above aspects, the correction value generating means for generating a correction value that changes with a delay upon a change in traffic in each base station is provided, and the correction value generated by this correction value generating means is used to select a base station.

With these arrangements, traffic can be distributed without increasing the base station facilities and requiring complicated and cumbersome control, thereby providing stable communication services. In addition, the number of users accommodated can be maximized by traffic distribution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system in which a plurality of base stations are distributed such that a communication range of each base station overlaps communication ranges of other adjacent base stations, and handoff control for a mobile station communicating through one of said plurality of base stations is performed on the basis of reception powers in said mobile station which are related to predetermined signals output from said respective base stations, comprising:

means for selecting a base station for taking charge of said mobile station, for which the handoff control is to be performed, on the basis of priority values, the priority values being mathematical functions of reception powers in said mobile station and traffic amounts in said respective base stations, the reception powers being related to predetermined signals output from said respective base stations; and means for performing handoff control to allow said mobile station to perform communication through said selected base station.

2. A system according to claim 1, wherein said base station selecting means selects a base station on the basis of priority values obtained by adding predetermined correction values corresponding to the traffic amounts in said respective base stations to reception power values in said mobile station for which handoff control is to be performed, the reception power values being related to the predetermined signals output from said respective base stations.

3. A system according to claim 2, wherein said base station selecting means adopts, as a priority value, a reception power value in said mobile station which is related to a predetermined signal output from a base station whose traffic amount is smaller than a predetermined value.

4. A system according to claim 1, wherein said system further comprises correction value generating means for generating a correction value that changes at delay intervals upon a change in the traffic amount in a base station, and said base station selecting means uses the correction value generated by said correction value generating means to select said base station.

5. A system according to claim 1, wherein said handoff control means is provided in each of said plurality of base stations and performs handoff control for a mobile station communicating through said base station in which said handoff control means is provided.

6. A system according to claim 5, further comprising a control station for collectively controlling said plurality of base stations, said control station comprising traffic amount notification means for notifying each of said plurality of base stations of traffic amounts in said remaining base stations.

7. A system according to claim 6, wherein said traffic amount notification means notifies each base station of the number of available traffic channels in said remaining base stations.

8. A mobile communication system in which a plurality of base stations are distributed such that a communication range of each base station overlaps communication ranges of other adjacent base stations, and handoff control for a mobile station communicating through one of said plurality of base stations is performed on the basis of reception powers in said mobile station which are related to predetermined signals output from said respective base stations, comprising:

means for selecting a base station for taking charge of said mobile station, for which the handoff control is to be performed, on the basis of reception powers in said mobile station and traffic amounts in said respective base stations, the reception powers being related to predetermined signals output from said respective base stations;

means for performing handoff control to allow said mobile station to perform communication through said selected base station; and correction value generating means having a conversion table for converting a traffic amount in each base station into a predetermined correction value, and said base station selecting means mathematically combines the correction value generated by said correction value generating means with a reception power to select a base station.

9. A base station used in a mobile communication system in which a plurality of base stations are distributed such that a communication range of each base station overlaps communication ranges of other adjacent base stations, and handoff control for a mobile station communicating through one of said plurality of base stations is performed on the basis of reception powers in said mobile station which are related to predetermined signals output from said respective base stations, comprising:

means for selecting a base station for taking charge of said mobile station, for which the handoff control is to be performed, on the basis of priority values, the priority values being mathematical functions of reception powers in said mobile station and traffic amounts in said respective base stations, the reception powers being related to predetermined signals output from said respective base stations; and means for performing handoff control to allow said mobile station to perform communication through said selected base station.

10. A base station according to claim 9, wherein said base station selecting means selects a base station on the basis of priority values obtained by adding predetermined correction values corresponding to the traffic amounts in said respective base stations to reception power values in said mobile station for which handoff control is to be performed, the reception power values being related to the predetermined signals output from said respective base stations.

11. A base station according to claim 9, wherein said base station selecting means adopts, as a priority value, a reception power value in said mobile station which is related to a predetermined signal output from a base station whose traffic amount is smaller than a predetermined value.

12. A base station according to claim 9, wherein said system further comprises correction value generating means for generating a correction value that changes delay intervals upon a change in the traffic amount in a base station, and said base station selecting means uses the correction value generated by said correction value generating means to select said base station.

13. A base station used in a mobile communication system in which a plurality of base stations are distributed such that a communication range of each base station overlaps communication ranges of other adjacent base stations, and handoff control for a mobile station communicating through one of said plurality of base stations is performed on the basis of reception powers in said mobile station which are related to predetermined signals output from said respective base stations, comprising:

means for selecting a base station for taking charge of said mobile station, for which the handoff control is to be performed, on the basis of reception powers in said mobile station and traffic amounts in said respective base stations, the reception powers being related to predetermined signals output from said respective base stations;

means for performing handoff control to allow said mobile station to perform communication through said selected base station; and correction value generating means having a conversion table for converting a traffic amount in each base station into a predetermined correction value, and said base station selecting means mathematically combines the correction value generated by said correction value generating means with a reception power to select a base station.

14. A base station controller used in a control station for collectively controlling a plurality of base stations in a mobile communication system in which said plurality of base stations are distributed such that a communication range of each base station overlaps communication ranges of other adjacent base stations, and handoff control for a mobile station communicating through one of said plurality of base stations is performed on the basis of reception powers in said mobile station which are related to predetermined signals output from said respective base stations, said base station controller comprising:

means for managing traffic amounts in said respective base stations; and traffic amount notification means for, in response to a request from any one of said plurality of base stations, notifying said base station as a request source of the traffic amounts in said remaining base stations, the traffic amounts being used with the reception powers to determine a base station that should take charge of said mobile station for which the handoff control is to be performed.

15. A base station controller according to claim 14, wherein said traffic amount managing means manages the number of available traffic channels in each base station.

16. A base station controller according to claim 14, wherein said traffic amount notification means notifies said base station of the number of available traffic channels in said remaining base stations.

17. In a mobile communication system having a plurality of base stations, wherein a coverage area of each base station overlaps a coverage area of other base stations, a method for controlling handoff of a communication involving a mobile station communicating through one of the plurality of base stations, said method comprising the step of:

determining whether to handoff a communication involving a mobile station being handled by a base station to another base station based on received power signals in said mobile station related to predetermined signals output by base stations other than the base station handling the communication and an amount of communication traffic being handled by each other base station; and selecting one of the other base stations to handoff the communication to based on priority values, the priority values being a function of the received power signals and the amount of communication traffic being handled by each other base station.

18. The method of claim 17 further comprising the step of notifying the base station handling the communication of the amount of communication traffic being handled by the other base stations.

19. The method of claim 18 wherein said step of notifying further includes notifying the base station handling the communication of the number of available traffic channels in other base stations.

20. In a mobile communication system having a plurality of base stations, wherein a coverage area of each base station overlaps a coverage area of other base stations, a base station handling a communication involving a mobile station, said base station comprising:

a receiver configured to receive information regarding power signals received by said mobile station related to predetermined signals output from the base station handling the communication and other base stations and an amount of communication traffic being handled by each of the other base stations; and a processor configured to generate first and second priority values, a first priority value being a mathematical function of the information received regarding power signals and the amount of communication traffic being handled by a first other base station, the second priority value being a function of the power signal of said base station handling the communication and the amount of communication traffic being handled by said base station handling the communication, and said processor configured to determine whether to handoff the communication involving said mobile station to the first other base station based on the first and second priority values.

21. The base station of claim 20, wherein the amount of communication traffic being handled by each other base station is the number of available channels in the other base station.

22. The base station of claim 20, wherein said processor is configured to generate a third priority value, the third priority value being a mathematical function of the information regarding power signals and the amount of communication traffic being handled by a second other base station, said processor configured to determine whether to handoff the communication involving said mobile station to the first other base station based on the first, second and third priority values.

* * * * *